(12) United States Patent
Vilander et al.

(10) Patent No.: US 6,771,635 B1
(45) Date of Patent: Aug. 3, 2004

(54) IP ADDRESS ALLOCATION FOR MOBILE TERMINALS

(75) Inventors: Harri Tapani Vilander, Espoo (FI); Tom Mikael Nordman, Kirkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/536,015

(22) Filed: Mar. 27, 2000

(30) Foreign Application Priority Data

Mar. 31, 1999 (GB) .............................................. 9907335

(51) Int. Cl.[7] .................................................. H04J 3/24
(52) U.S. Cl. ...................................................... 370/349
(58) Field of Search ................................ 370/349, 328, 370/310.1, 310.2, 321, 322, 379, 455, 466

(56) References Cited

U.S. PATENT DOCUMENTS

| | | | | |
|---|---|---|---|---|
| 5,572,528 | A | * 11/1996 | Shuen | ......................... 370/402 |
| 6,147,986 | A | * 11/2000 | Orsic | ......................... 370/349 |

FOREIGN PATENT DOCUMENTS

| | | |
|---|---|---|
| EP | 0 883 266 A | 12/1998 |
| WO | WO 99/16266 | 1/1999 |
| WO | WO 99/17568 | 8/1999 |

OTHER PUBLICATIONS

R. Hindon, S. Deering; IP Version 6 Addressing Architecture, RNC 2373; Jul. 1998.*
Guidelines for 64-bit Global Identifier (EUI-64) Registration Authority; IEEE Standards.*
*Proceedings of the Conference on Computer Communications (INFOCOM)*, US, New York, IEEE, vol. CONF. 11, 1992, pp. 626–632, XP000300088, ISBN: 0-7803-0602-3, D. Cohen et al., "IP Addressing and Routing in a Local Wireless Network".
*IEICE Transactions on Communications*, JP, Institute of Electronics Information and Comm. Eng., Tokyo, Japan, vol.. 80-B, No. 8, Aug. 1, 1997, pp. 1132–1137, XP000723080, ISSN: 0916-8516, F. Teraika, "Mobility Support with Authentic Firewall Traversal in IPV6".
*IEEE Network*, vol. 12, No. 4, Jul. 1, 1998, pp. 4–10, XP002142781, Bo Ryu, Jun Wei, Yongguang Zhang, & Son Dao, "Managing IP Services Over a PACS Packet Network".

* cited by examiner

*Primary Examiner*—Wellington Chin
*Assistant Examiner*—Mark A Mais
(74) *Attorney, Agent, or Firm*—Nixon & Vanderhye P.C.

(57) ABSTRACT

A method of allocating an Internet Protocol (IP) address to a mobile wireless terminal within a mobile telecommunications network. During the establishment of the radio link between the terminal and the network, a negotiation is conducted to provide the mobile terminal with a host part for an IP address, where the host part is unique within the radio network. In the case of a UMTS network, the host part is the Radio Network Terminal Identity (RNTI).

9 Claims, 2 Drawing Sheets

IP ADDRESS ALLOCATION FOR MOBILE TERMINALS

FIELD OF THE INVENTION

The present invention relates to the allocation of IP addresses to mobile terminals and in particular to the allocation of a host part of an IP address to a mobile terminal.

BACKGROUND TO THE INVENTION

Subscribers to existing mobile telecommunications networks may under certain circumstances access the Internet using either an Internet enabled mobile telephone (a device often referred to as a "communicator") or by coupling a palmptop or laptop computer to a conventional mobile telephone, for example using a software or hardware modem.

In digital mobile telephone networks, such as the European GSM (Global System for Mobile communications) system, a mobile telecommunications network can be divided into two parts. The first part is referred to as the "radio network" and consists of base stations (BSs) and base station controllers (BSCs) where a single BSC controls a number of BSs. The second part of the network is referred to as the "core network" and comprises mobile switching centres (MSCs), each MSC being responsible for a number of BSCs. An MSC is analogous to an exchange of a conventional telephone network. Internet traffic is carried over a circuit switched connection established between the mobile terminal and an Internet Service Provider (ISP) via the core network.

The development of future mobile communication standards is currently ongoing. In particular, an enhancement to GSM known as General Packet Radio Service (GPRS) is being developed to introduce a packet switched service into GSM. The introduction of GPRS will effectively add an additional core network to GSM systems, with switching functions being performed in the GPRS core network by Serving GPRS Switching Nodes (SGSNs) and Gateway GPRS Switching Nodes (GGSNs). A third generation digital system is also under development and is known as Universal Mobile Telecommunications System (UMTS). UMTS is likely to incorporate GPRS or a similar packet switched system.

Under current proposals, in both GSM GPRS and UMTS systems, Internet access will be obtained via the packet switched core network. When a mobile terminal requests Internet access, the request is directed via a BS and a Radio Network Controller (RNC, equivalent to the traditional BSC) to a GGSN. The GGSN may act as an Internet Access Server (IAS) or direct the request to a separate IAS. Such a separate IAS is typically operated by an Internet Service Provider (ISP) which is independent from the operator of the mobile network. However, the IAS may alternatively be operated by the mobile network operator. In any case, the integrated or separate IAS allocates to the calling mobile terminal an Internet Protocol (IP) address. According to the existing Internet Protocol version 4 (IPv4), the IP address has 32 bits. According to the proposed Internet Protocol version 6 (IPv6), the IP address is enlarged to 128 bits and comprises a 64 bit routing prefix which uniquely identifies the LAS to the Internet, and also a 64 bit host prefix which uniquely identifies the mobile terminal to the IAS.

The allocated IP address is returned to the mobile terminal via the packet switched core network and the radio network whereupon the mobile terminal is able to commence an Internet session. Assuming that the mobile terminal is registered with its home network when the Internet access is requested, the Internet session is routed via the GGSN of the home network. However, when a mobile terminal is "roaming" and is registered with a foreign network, the Internet session may be conducted via both a GGSN of the home network and a SGSN of the foreign network.

As subscribers of existing digital networks may be aware, Internet access via a mobile terminal is generally extremely slow and unreliable. This is due in part to the need for a slow set-up phase, required each time a new transfer session is commenced, during which session parameters including an IP address are negotiated. Another reason for slow speed (as well as unreliability) is the possibly large distance between the node (e.g. IAS) which allocates an IP address and the mobile terminal, possibly involving one or more intermediate nodes. IP datagrams must be tunnelled between the two end points, often involving additional protocols (e.g. Point-to Point Protocol, Layer 2 Tunnelling Protocol, etc), consuming extra processing and transmission capacity.

Whilst the current proposals for GPRS and UMTS will result in a faster and more reliable radio connection between a mobile terminal and the radio and core networks, they will not eliminate the need to negotiate the IP address prior to commencing an Internet session nor the need to route IP datagrams via one or more switching nodes of the packet switched core network(s).

It is anticipated that in Pv6, two Internet Control Message Protocol (ICMP) messages will be utilised for the purpose of negotiating a host part of an IP address for a mobile terminal connected to a fixed line communications network. A mobile terminal proposes a host part which may be a host part permanently allocated to the mobile terminal or may be the host part last used by the mobile terminal. The proposed host part is included in a Neighbour Solicitation message which is sent by the mobile terminal to other mobile terminals currently connected to the same fixed line network. If it transpires that another of the connected terminals is currently using the same host part, then that other mobile terminal responds by returning a Neighbour Advertisement message to the newly connected mobile terminal. In the event that the newly connected mobile terminal receives such a Neighbour Advertisement message, it must reject the originally proposed host part and propose a new host part. The mobile terminal then includes this newly proposed host part in a Neighbour Solicitation message and the process is repeated until a unique host part has been arrived at.

As already noted, the host part generation process of Pv6 is concerned with mobile terminals connected to fixed line networks. However, the process is not necessarily easily applied in the case of mobile wireless terminals connected to a mobile telecommunications network. For example, a mobile network will not necessarily provide for a mobile wireless terminal to broadcast Neighbour Solicitation messages to other mobile terminals connected to the same network (GPRS and UMTS do not provide for mobile terminal to mobile terminal signalling). Whilst it may be possible to transmit a Neighbour Solicitation message to the mobile network and thereafter to broadcast the Neighbour Solicitation message to other mobile terminals, such a solution would be wasteful of radio interface resources.

A further disadvantage of the proposed IPv6 in so far as it relates to IP address allocation, is that, if a mobile terminal is permanently allocated a host part, it may be possible for third parties to track the movement of a mobile terminal and hence of the user of a mobile terminal. Assuming that such a third party is aware of the host part allocated to a given mobile terminal, and has knowledge of the unique routing prefixes allocated to the various networks, then he could determine the current location of a mobile terminal.

SUMMARY OF THE INVENTION

It is an object of the present invention to overcome or at least mitigate the above noted disadvantages of existing systems and methods of allocating IP addresses to mobile terminals. This and other objects are achieved at least in part by negotiating a temporary host part during the establishment of a radio link between a mobile terminal and a mobile telecommunications network. The temporary host part may be used for subsequent IP sessions whilst the mobile terminal is within the mobile network.

According to a first aspect of the present invention there is provided a method of allocating an IP address to a mobile wireless terminal within a mobile telecommunications network, the method comprising conducting a negotiation between the mobile terminal and the network during the establishment of a radio link, to determine a host part of the IP address, wherein said host part may be used by the mobile terminal to generate an IP address for use in subsequent Internet sessions.

Embodiments of the present invention enable an IP address to be made available at a mobile terminal prior to commencing an Internet session. Thus, there is no need for a further IP address negotiation immediately prior to the Internet session. Furthermore, as the initial negotiation forms part of the radio link establishment, data transfer requirements are likely to be optimised.

Preferably, the host part is proposed by the radio network. More preferably, the host part is an identifier allocated to the mobile terminal in connection with one of the standardised air interface protocol layers. More preferably, and in the case of UMTS, the Radio Network Temporary Identity (RNTI) is used as the host part.

Alternatively, the host part may be proposed by the mobile terminal. For example, the mobile terminal may generate a random proposed host part. During the negotiation, the network may accept or reject the proposal depending upon whether or not a mobile terminal, having the same host part, is currently registered with the network.

According to a second aspect of the present invention there is provided apparatus for allocating an IP address to a mobile wireless terminal within a mobile telecommunications network, the apparatus comprising means distributed between a mobile wireless terminal and a mobile telecommunications network for conducting a negotiation between the terminal and the network during the establishment of a radio link, to determine a host part of an IP address, the mobile terminal further comprising means for generating an IP address incorporating said host part for use in subsequent Internet sessions.

According to a third aspect of the present invention there is provided an Internet enabled mobile wireless terminal, the mobile terminal being arranged to conduct a negotiation with a mobile telecommunications network to determine a host part of an IP address, the mobile terminal being further arranged to generate an IP address incorporating said host part for use in subsequent Internet sessions.

According to a fourth aspect of the present invention there is provided a method of allocating an IP address to a mobile wireless terminal within a mobile telecommunications network, wherein the IP address comprises a routing part and a host part, the method comprising utilising as said host part a parameter transmitted from the mobile network to the mobile terminal for the purpose of setting-up the radio link between the terminal and the network.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF CERTAIN EMBODIMENTS

Figure 1:
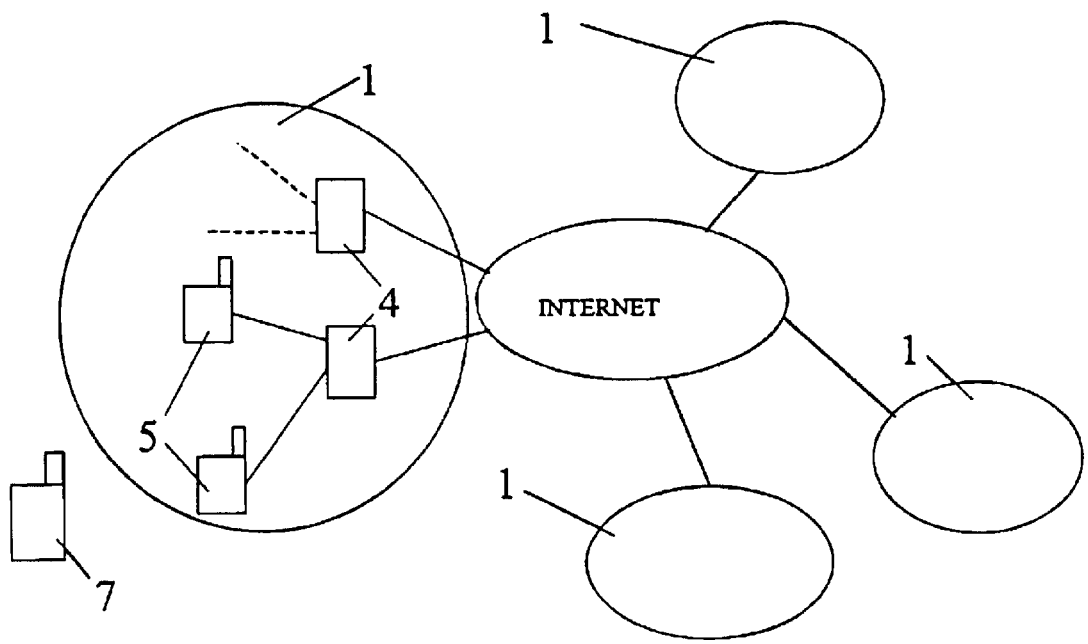
FIG. 1 illustrates schematically a mobile telecommunications system.

A GSM based telecommunication system incorporating the proposed General Packet Radio Service (GPRS) is illustrated schematically in FIG. 1 and comprises a number of radio networks 1 which may or may not have overlapping radio coverage. Each radio network 1 has its own unique radio network identity (ID1 to ID4) and comprises a plurality of Radio Network Controllers (RNCs) 4, each RNC4 being responsible in turn for a plurality of Base Stations (BSs) 5. Each RNC 4 effectively comprises an integrated IAS (or the functionality thereof), which enables the RNCs 4 to be coupled directly to the Internet.

FIG. 1 illustrates a mobile terminal 7 which is located within a cell associated with a given radio network 1. When the mobile terminal 7 is switched on, or first enters the geographical area covered by the radio network 1, the terminal 7 begins scanning the broadcast channel(s) of that network 1. By listening to the broadcast information, the mobile terminal 7 is able to select a suitable network (if there are several networks available), to synchronise with the selected network, and to initiate layers of the radio link (namely the CDMA physical layer and the medium access control, radio link control, and radio resource control layers). Each RNC 4 of the radio network 1 broadcasts over a predefined broadcast channel an IP routing prefix which has previously been allocated to that RNC 4 and which is worldwide unique to the RNC 4. Typically, the routing prefix corresponds to the RNC ID or may be a combination of RNC ID and network ID. By listening to the broadcast channel, the mobile terminal 7 is able to identify the routing prefix of the controlling RNC 4 and is subsequently able to generate an IP address using the routing prefix.

Figure 2:
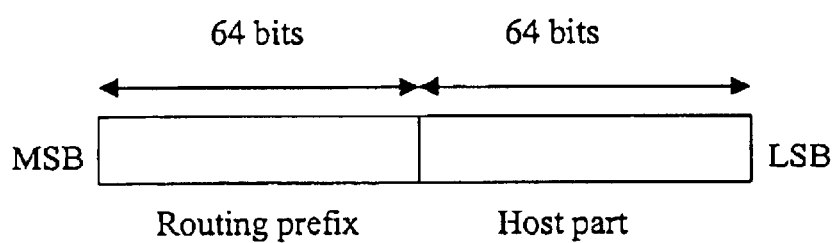
FIG. 2 illustrates the structure of an IP address according to an IPv6.
Figure 3:
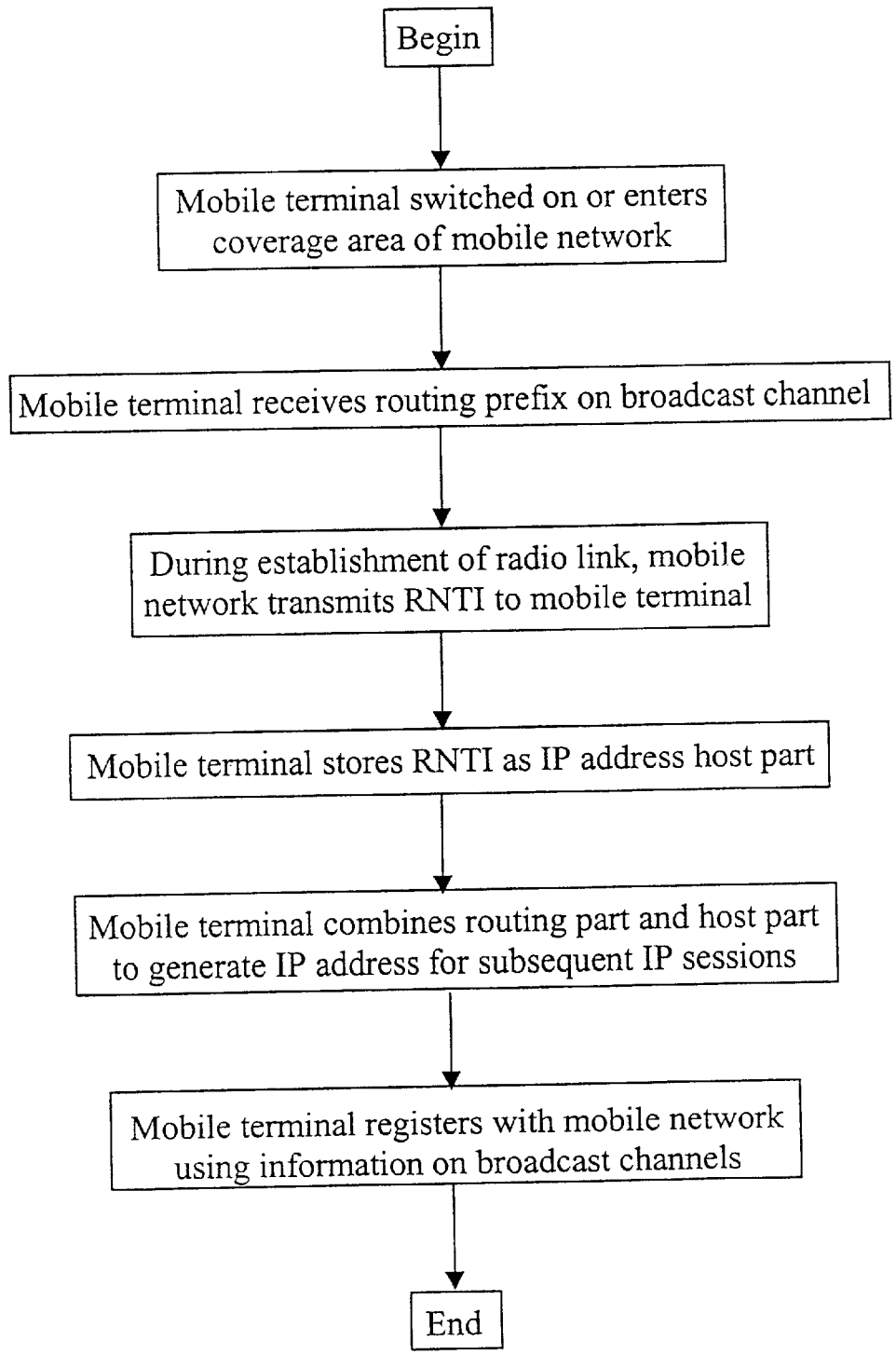
FIG. 3 is a flow diagram illustrating a method of allocating the host part of the IP address of FIG. 2 in the system of FIG. 1.

FIG. 2 illustrates the structure of an IP address according to IPv6. The address comprises a 64 bit prefix (MSBs) containing the routing prefix. This prefix is used by routers in the Internet to route IP datagrams to the originating RNC 4. The second part of the address (LSBs) is also 64 bits in length, and represents a host part which uniquely identifies the originating mobile terminal 7 to the RNC 4.

A suitable host part is negotiated between the mobile terminal 7 and the radio network 1 during the establishment of (lower) communication layers over the air interface (i.e. CDMA physical layer; medium access control layer; radio link control layer; and radio resource control layer). The negotiation is initiated by the radio network proposing a suitable host part which it knows is unique within its coverage area. The proposed host part may be a dedicated identifier or may serve some other purpose associated with one of the layers of the radio link. For example, in UMTS, it is currently proposed that the radio network controller (RNC) allocates to each mobile terminal, during registration, a Radio Network Temporary Identity (RNTI) which is unique to the registering mobile terminal. Alternatively, some other unique identity may be used. In any case, the mobile terminal receives the proposed host part and is able to combine this with the received routing prefix to form an IP address for use in subsequent Internet sessions.

In the case where RNTI is used as the host part, it is noted that in inter-RNC handovers, i.e. when control of a mobile terminal is passed from one RNC to another, a new RNTI is assigned to the mobile terminal and in consequence a new IP address is generated. Datagrams directed to a previous IP address may be tunnelled to the new address by the radio network 1.

The exact form of future generation digital mobile telecommunication standards, such as GPRS and UMTS, are not yet finally specified. In the event that no suitable identity, such as the RNTI, is available in the final protocols, an alternative solution to allocating a host part to a mobile terminal 7 may be to allow the mobile terminal 7 to generate a temporary host part upon registering with a radio network 1. For example, the mobile terminal 7 may generate a random 64 bit identity which is transmitted to the radio network 2. The radio network 1 is then able to check whether another mobile terminal 7 currently registered with the radio network 1 is using the proposed part. If not, then the radio network 1 is able to transmit an Accept message to the mobile terminal 7 and, if a conflict does exist, then the radio network 2 transmits a Deny message to the mobile terminal 7. In the latter situation, the mobile terminal 7 may propose an alternative random host part or the radio network 2 itself may propose an alternative host part. However, given that the 64 bit length of the host part provides for $2^{64}$ different alternatives, the possibility of a conflict is small.

Still another possibility is for the RNC to utilise an authentication or authorisation certificate, provided by the mobile terminal, as the IP address host part. This certificate is generally ciphered, and may be intended for the mobile terminal's home Internet Service Provider (ISP) to authenticate the terminal to the ISP. Alternatively, the certificate may correspond to an electronic cash payment. The ciphered certificate may be used directly to provide the required host part, or some function (e.g. a hash function) may be applied to the certificate.

Yet another possibility is to use some other message sent between the mobile terminal and the RNC during the set-up phase of the radio link. Again, a hash function may be applied to the message, with the resulting check sum being used as the host part.

It will be appreciated by the person of skill in the art that various modifications may be made to the above described embodiment without departing from the scope of the present invention.

What is claimed is:

1. A method of allocating an IP address to a mobile wireless terminal within a mobile telecommunications network, the method comprising:

conducting a negotiation between the mobile terminal and the network to determine a host part of the IP address, wherein the host part is an identifier allocated to the mobile terminal by the mobile telecommunications network in connection with a standardized air interface protocol layer, and using the host part may be used by at the mobile terminal to generate an IP address for use in a subsequent Internet session.

2. A method according to claim 1, wherein the mobile network is a UMTS network, and the Radio Network Temporary Identity (RNTI) is used as the host part.

3. A method according to claim 1, wherein an authentication or authorization certificate, sent between the mobile terminal and the mobile network during the set-up phase of the radio link, is used as the host part or is used to generate the host part.

4. A method according to claim 1, wherein the negotiation is conducted during the establishment of a radio link between the mobile terminal and the mobile network.

5. A method according to claim 1, wherein the mobile network comprises a radio network part and the allocation of a host part to the mobile terminal is controlled by the radio network.

6. A method according to claim 5, wherein the allocation of a host part to the mobile host is controlled by a Radio Network Controller (RNC) of the radio network.

7. Apparatus for allocating an IP address to a mobile wireless terminal within a mobile telecommunications network, the apparatus comprising means distributed between a mobile wireless terminal and a mobile telecommunications network for conducting a negotiation between the terminal and the network to determine a host part of an IP address, the host part being an identifier allocated to the mobile terminal by the mobile telecommunications network in connection with a standardized air interface protocol layer, the mobile terminal further comprising means for generating an IP address incorporating the host part for use in a subsequent Internet session.

8. An Internet enabled mobile wireless terminal, the mobile terminal being arranged to conduct a negotiation with a mobile telecommunications network to determine a host part of an IP address, the host part being an identifier allocated to the mobile terminal by the mobile telecommunications network in connection with a standard air interface protocol layer, and the mobile terminal being further arranged to generate an IP address incorporating the host part for use in a subsequent Internet session.

9. Apparatus for allocating an IP address to a mobile wireless terminal within a mobile telecommunications network, the apparatus comprising means distributed between a mobile wireless terminal and a mobile telecommunications network for conducting a negotiation between the terminal and the network to determine a host part of an IP address, the host part being an identifier allocated to the mobile terminal by the mobile telecommunications network in connection with a standardized air interface protocol layer, the mobile terminal further configured to generate an IP address incorporating the host part for use in a subsequent Internet session.

* * * * *